(12) United States Patent  
Winterowd et al.

(10) Patent No.: US 8,501,841 B2  
(45) Date of Patent: Aug. 6, 2013

(54) UTILIZATION OF KRAFT LIGNIN IN PHENOL/FORMALDEHYDE BONDING RESINS FOR OSB

(71) Applicant: Weyerhaeuser NR Company, Federal Way, WA (US)

(72) Inventors: Jack G. Winterowd, Puyallup, WA (US); Cheng Zhang, Rockville, MD (US); Amar N. Neogi, Kenmore, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 13/671,218

(22) Filed: Nov. 7, 2012

(65) Prior Publication Data

US 2013/0066012 A1    Mar. 14, 2013

Related U.S. Application Data

(62) Division of application No. 12/947,703, filed on Nov. 16, 2010.

(51) Int. Cl.  
*C08L 97/00* (2006.01)  
*C08K 5/13* (2006.01)

(52) U.S. Cl.  
USPC ........................................... 524/73

(58) Field of Classification Search  
USPC ............................................. 524/73  
See application file for complete search history.

(56) References Cited

U.S. PATENT DOCUMENTS

| | | | |
|---|---|---|---|
| 2,282,518 A | 5/1942 | Hockwalt |
| 3,076,772 A | 2/1963 | Christ |
| 3,285,801 A | 11/1966 | Sarjeant |
| 5,866,642 A | 2/1999 | McVay et al. |
| 6,632,912 B2 | 10/2003 | Sudan |
| 2002/0065400 A1 | 5/2002 | Raskin et al. |

*Primary Examiner* — John Uselding  
(74) *Attorney, Agent, or Firm* — Timothy M. Whalen (57) ABSTRACT

A resin for OSB comprising an aqueous resole reaction product of phenol, formaldehyde, alkaline metal hydroxide or carbonate, urea and a degraded lignin polymer having 35-65% solids, a pH of 8-13 and a viscosity 50-1000 centipoises. The phenol and formaldehyde are present in a molar ratio of 1.5 to 3.4 moles formaldehyde to 1 mole phenol and are 40 to 85% of the total solids added to the mixture. In one embodiment they are 50 to 75% of the total solids added to the mixture. The alkaline metal hydroxide or carbonate are 5 to 20% of the total solids added to the mixture. Urea is 5 to 35% of the total solids added to the mixture. The degraded lignin is 5 to 20% of the total solids added to the mixture. A method for making the resin and a product using the resin.

7 Claims, 4 Drawing Sheets

FIGURE 3.
THERMAL SCHEDULE FOR LABORATORY VOC ANALYSIS FRACTIONAL DISTALLATION SAMPLES

UTILIZATION OF KRAFT LIGNIN IN PHENOL/FORMALDEHYDE BONDING RESINS FOR OSB

This application is a division of prior application U.S. patent application Ser. No. 12/947,703 filed Nov. 16, 2010, and titled "THE UTILIZATION OF KRAFT LIGNIN IN PHENOL/FORMALDEHYDE BONDING RESINS FOR OSB," the contents of which are incorporated herein by reference.

The field of the invention is a bonding resin for oriented strandboard, a method for making the resin and the resulting oriented strandboard.

Oriented strandboard (OSB) is a wood-based composite that is commonly used in residential and commercial construction, furniture and other applications in North America. OSB is generally manufactured by cutting strands from round wood, drying the strands, applying wax and bonding resin (binder) to the strands, forming the treated strands into a mat on a continuous line, and then consolidating the mat under heat and pressure for an extended period of time. The later is accomplished by use of a hot-press.

On average strands are about $\frac{1}{32}$" thick, 0.5-1.5" wide, and 2-6" long. The length axis of the strand is approximately parallel to the grain of the wood. The OSB mat is usually comprised of discrete surface and core layers. Strands in the surface layer are larger on average than the strands used in the core layer. Special machines are used in the forming line of an OSB mill to orient a significant number of the strands in the surface layer parallel to the machine-direction of the forming line. Conversely, an attempt is made to orient a significant number of the strands in the core layer in the cross-machine direction.

In general there are three different types of bonding resin used to make OSB. These are liquid phenol/formaldehyde resole resins (LPF), such as Georgia-Pacific's 70CR66 resin; powdered phenol/formaldehyde resole resins (PPF), such as Hexion's W3154N resin; and polymeric diphenylmethane diisocyanate (pMDI) such as Huntsman's Rubinate 1840.

A resole resin is a resin made under base-catalyzed conditions with a formaldehyde to phenol ratio of more than one to produce highly methylolated structures.

Each of these different binder types has it own characteristic set of performance attributes and limitations. LPF resins are relatively low in cost, but develop bond strength more slowly than pMDI and are less tolerant to high moisture levels in the wood. PPF resins develop bond strength relatively quickly and are more tolerant to high moisture content levels, but are more expensive than an LPF resin and application rates are limited to about 3% of the wood mass. PMDI tends to develop bond strength quickly and the ultimate bond strength values tend to be greater than that associated with an equivalent level of LPF or PPF. However, pMDI is relatively expensive and often does not work well on dry strands. PMDI has an additional limitation related to its tendency to bond to the press platen.

Due to an array of considerations, including thermal and moisture gradients which spontaneously evolve during the hot-pressing cycle, it is often advantageous for different binder types to be used for each of the different layers. For instance, it is common for pMDI to be used in the core layer of an OSB mat, which has a relatively low temperature and a high moisture content level during the hot-pressing cycle. LPF resins are often preferred for use in the surface layer of an OSB mat where the temperature is relatively high and the moisture content is relatively low.

Liquid bonding resins for OSB have a number of performance and application requirements. For instance, in order to accommodate the spray or atomization application equipment these resins must have a viscosity less than about 500 cps. Depending on the resin pump size, targeted adhesive dosing rates and wood flow rates, the viscosity might need to be less than about 250-300 cps. These viscosity limitations are important when PF resin is being used as a bonding agent. PF resins typically undergo significant increases in viscosity during storage. For instance, a PF resin that is manufactured with an initial viscosity of 150 cps, could have a viscosity of 500 cps after one week of storage at a temperature of 70° F. The tendency for PF resins to rapidly advance in viscosity causes some challenges for OSB manufacturers from an inventory management perspective. Thus, there is a need for PF resins for use in OSB that exhibit a slower rate of viscosity advancement under storage conditions.

A second requirement of bonding resins for OSB relates to a need for minimal contribution to the emission of volatile chemicals both internal and external to an OSB mill. Common chemicals emitted from a PF resin during the process of mat consolidation at elevated temperature include phenol, methanol and formaldehyde. Ammonia is also routinely emitted from PF bonding resins used in OSB applications. The ammonia is generated by the hydrolysis of urea, which can be promoted by alkaline and high-temperature conditions.

Most liquid PF resins used for OSB contain urea at substantial levels. Urea is incorporated into the resin for the purpose of viscosity reduction and the consumption of free-formaldehyde. Urea is well suited for these functions by virtue of its reactivity, solubility, low molecular weight, low-cost, availability, and favorable toxicity profile. It is quite common for urea levels in liquid PF resins for use in OSB to be as high as 15-40% based on the solids content of the resin. Thus, liquid PF resins for use in OSB are actually quite unique relative to PF resins that are used in other wood bonding applications.

OSB mills in the United States are regulated for the amount of phenol, methanol, formaldehyde and other organic compounds that are emitted from the mill into the surrounding environment. Emission of ammonia external to the mill is not regulated at this point in time. However, ammonia present in the waste air stream from the plant can be converted to $NO_x$ in reactive thermal oxidizers (RTOs) that are commonly installed in the air exhaust system prior to the stack. There are limitations in the amount of $NO_x$ that can be emitted from OSB mills in the United States and these have the potential to govern overall production rates in some mills.

Additionally, ammonia is a poisonous gas and there are frequently ammonia emissions inside the mill near the blenders, forming line and press area. The ammonia inside the mill could pose a risk to workers inside the mill if the concentration exceeds a given threshold. Thus, there is a need to reduce ammonia emissions stemming from liquid PF resins in an OSB mill.

A third requirement of bonding resins for OSB is that they provide high strand-to-strand bond strength with minimal cure time in the press at a low cost. Binder costs actually represent a substantial portion of the total cost to produce OSB. Thus, there is a need for a PF resin that provides high bond strength with minimal cure time at a lower cost.

We have made the surprising discovery that the shelf-life and chemical emission properties in a liquid PF resin for use in OSB can be improved by incorporation of a particular degraded lignin material that is isolated from "black liquor" generated in the kraft wood pulping process. Specifically, the degraded lignin material is incorporated into a liquid PF resin targeted for use in OSB replacing some of the urea component, which results in a novel composition with the aforementioned advantages, as well as reduced raw material costs.

Native lignin is a high-molecular-weight phenylpropane polymer that is present in wood at a level of about 24-35% in softwood and 17-25% in hardwood. Native lignin in wood is not soluble in water and one of its functions in the plant is to bond the cellulose fibers (wood cells) together. In the commercial kraft pulping process wood chips are steeped in aqueous solutions of sodium sulfide and sodium hydroxide at elevated temperatures in order to degrade the native lignin to the point of being soluble in water. This allows for isolation of the high-value wood fibers.

The residual aqueous solution of degraded lignin, sodium carbonate and sodium sulfate is commonly referred to as "black liquor". Usually, the black liquor also contains various carbohydrates. Conventional black liquor has a pH value of about 13-14. The degraded lignin present in black liquor can be isolated in discreet fractions by addition of acids to lower the pH value. As the pH level is decreased, there is initial precipitation of the highest molecular weight lignin compounds. These can be separated from the residual liquor by filtration. A further reduction in the pH value results in precipitation of more lignin compounds, which have lower molecular weight than the first fraction. This second set of precipitated compounds can also be isolated by filtration. This process can be conducted multiple times to yield an array of fractions.

Acids suitable for this process include strong acids such as sulfuric acid, nitric acid, and hydrochloric acid; or weak acids such as acetic acid or carbonic acid. The later is achieved by injecting carbon dioxide into the black liquor. The use of carbon dioxide to precipitate lignin from black liquor was described as long ago as 1942 in U.S. Pat. No. 2,282,518. For the purpose of the present invention it is important to separate the degraded lignin from the other compounds in the black liquor, such as sulfate salts and carbohydrates, which can have deleterious effects on the emission potential of a binder, the strength development rate, and/or the ultimate bond strength.

Some compounds in whole black liquor or whole spent sulfite liquor can have deleterious effects on the performance of a phenolic binder resin for an OSB application. Also, spent sulfite liquors contain lignosulfonate, as opposed to kraft lignin, which is mostly free of sulfonic acid groups. The sulfonic acid groups in the lignosulfonate salts, which are present in binders that are partially comprised of sulfite liquors, can adversely affect the performance of the OSB when it is exposed to water.

One aspect of our invention relates to a particular compositional balance between phenol/formaldehyde adduct, group 1 alkaline metal hydroxide, urea and degraded lignin in liquid PF resins.

DETAILED DESCRIPTION OF THE INVENTION

The present invention is a bonding resin suitable for use in the production of oriented strandboard (OSB). The resin is an aqueous resole having a percent solids of about 35-65%, a pH of about 8-13, a viscosity of about 50-1,000 cps, and being comprised of the reaction product of phenol, formaldehyde, alkaline metal hydroxide or carbonate, urea and a degraded lignin polymer. The phenol and formaldehyde are present in a molar ratio of 1.5 to 3.4 moles formaldehyde to 1 mole phenol and are 40 to 85% of the total solids added to the mixture. In one embodiment they are 50 to 75% of the total solids added to the mixture. The alkaline metal hydroxide or carbonate are 5 to 20% of the total solids added to the mixture. Urea is 5 to 35% of the total solids added to the mixture. The degraded lignin is 5 to 20% of the total solids added to the mixture.

It is believed that the reaction product contains phenol/formaldehyde adduct and an alkaline metal salt or alkaline metal salts of the phenol-formaldehyde adduct (40-85% of the total weight of the solids in the resin), urea (5-35% of the total weight of the solids in the resin), and a degraded lignin polymer and an alkalline metal salt or alkaline metal salts of the degraded lignin polymer (5-25% of the total weight of the solids in the resin). It is also believed that there is also a reaction product of the phenol formaldehyde adduct and the degraded lignin which is included within their total amounts, and a reaction product of the urea and free formaldehyde which has not reacted in the forming of the adduct and which is included in the urea amount. As used herein degraded lignin polymer is lignin which has been isolated as a precipitate from kraft pulping black liquor by addition of one or more acids or carbon dioxide to adjust the pH of the black liquor to a pH of 7 to 12 and washed to remove the contaminants described above The percent solids value is determined by quantitatively loading a small aluminum weighing pan with liquid resin (2-3 grams (g)) and heating in an oven at a temperature of 125° C. for a period of 3.5 hours. The residual mass of the resin is then determined and the percent solids value is calculated by dividing the residual resin mass by the initial wet mass of the resin and multiplying this quotient by 100%. Preferred ranges for the percent solids values are 45-60%.

Methods for measuring the pH of an aqueous solution are well known in the art and are suitable for this invention. In one embodiment the pH values for the final resin are 10-12.5.

Gardner-Holdt bubble tubes are commonly used to measure viscosity values in the PF resin industry, but are difficult to use with resins of the present invention because the exceptionally dark color of the resin containing the degraded lignin polymer makes it difficult to see the bubble in the sample tube under normal lighting conditions. Thus, viscosity is typically measured with a Brookfield Digital Viscometer [Model DV-I Prime equipped with Small Sample Adapter with water jacket temperature control and a SC4-18 spindle]. Viscosity values are measured at a resin temperature of about 25° C. In one embodiment the viscosity values for the final resin are 100-500 cps In another embodiment the viscosity values for the final resin are 120-350 cps.

Most or all of the degraded lignin, most or all of the phenol and at least ten percent of the formaldehyde are introduced into the reactor in the initial stages of the resin synthesis. Most or all of the urea are introduced into the reactor during the final stages of the resin synthesis.

The resin is made by reacting formaldehyde and phenol at a molar ratio of 1.5-3.5 moles of formaldehyde to one mole of phenol in the presence of a degraded lignin polymer, water and a group 1 alkaline metal hydroxide at a temperature of 60-100° C. for a period of time sufficient to achieve a viscosity of 200-5,000 cps. The formaldehyde, water, group 1 alkaline metal hydroxide, phenol and degraded lignin polymer may be combined in a number of ways. They may all be added together in a single charge or several discrete charges. The latter is preferable. The formaldehyde, water and group 1 alkaline metal hydroxide may be added to a reactor along with the phenol and degraded lignin polymer prior to initiating the reaction during the first stage of this process, or the formaldehyde, water and group 1 alkaline metal hydroxide might be added in multiple discreet aliquots to the phenol and degraded lignin polymer during this first stage. This first stage of resin synthesis is the polymerization stage, because this is when the phenol and formaldehyde are reacted together to form a polymeric material.

In a second stage of the synthesis process the mixture is cooled to a temperature of less than 60° C., and urea, and optionally water and a group 1 alkaline metal hydroxide, are added with stirring to form the final resin binder composition. The viscosity of the composition is 50-1000 cps.

Phenolic resin made using degraded lignin polymer has advantages over existing OSB binder technologies. These advantages include reduced ammonia emissions, improved shelf life and lower cost without loss of board properties, including internal bond strength.

Phenol/formaldehyde adducts associated with this invention are formed by the reaction of phenol and formaldehyde in the presence of a degraded lignin polymer and a group 1 alkaline metal hydroxide in an essentially aqueous medium. In one embodiment the formaldehyde/phenol molar ratio is 2.0-3.0 moles of formaldehyde to one mole of phenol. The formaldehyde reactant can exist as either a formalin solution or decomposable formaldehyde products such as paraformaldehyde or trioxane. In the event that formalin is used the solution concentration can generally be as high as about 50%.

Levels of the different components are selected to achieve a composition in the final resin corresponding to phenol/formaldehyde adduct and an alkaline metal salt or alkaline metal salts of the phenol-formaldehyde adduct (40-85% of the total weight of the solids in the resin), urea (5-35% of the total weight of the solids in the resin), and a degraded lignin polymer and an alkalline metal salt or alkaline metal salts of the degraded lignin polymer (5-25% of the total weight of the solids in the resin). The term 'phenol/formaldehyde adduct' simply means reaction product of phenol and formaldehyde. Adducts of phenol and formaldehyde could include relatively small compounds such as methylolated phenol or larger molecules that are products of the condensation of methylolated phenol. The urea and, optionally, some portion of the caustic and water are added subsequent to polymerization of the phenol and formaldehyde reaction mixture.

The mixture has a viscosity of about 200-5,000 cps at the end of the first stage of the synthesis process (i.e. the polymerization process). In one embodiment the reaction temperature for the first stage of resin synthesis is 70-95° C. and the temperature is adjusted throughout the polymerization process to maintain it within this range. The pH of the reaction mixture is initially adjusted to a value of about 7.5-9.0 in order to minimize undesirable disproportionation of formaldehyde to formic acid and methanol (Cannizzaro reaction) while significant levels of free formaldehyde are present.

Examples of group 1 alkaline metal hydroxides suitable for this invention include sodium hydroxide, potassium hydroxide, lithium hydroxide, rubidium hydroxide, cesium hydroxide, and francium hydroxide. Other alkaline materials such as sodium carbonate and potassium carbonate can also be used in place of or in addition to the group 1 alkaline metal hydroxide for the purpose of this invention. There would be residuals of the carbonates in the resin. These could include bicarbonates.

The degraded lignin polymer can be obtained from the substance commonly known as 'black liquor'. The black liquor can be derived from wood chips, including those based on softwood or hardwoods. Softwoods can include pines (loblolly, lodge pole, slash, pitch, ponderosa, shortleaf, yellow, white, jack and red), fir (Douglas, Frazier, white, balsam, Pacific silver, sub alpine), cedar (Alaskan, Northern white, Eastern red, Western red, incense, Port Orford), spruce (red, white, black, englemann, Sitka), hemlock (Eastern, Western, Mountain, larch) and others. Hardwoods can include oak (white, red, bur, live), poplar (yellow, balsam, quaking aspen, big tooth), maple (sugar, silver, red), basswood, birch, alder, beech, gum, cherry, cypress, elm, hack berry, hickory, sassafras, sycamore, cucumber, walnut, locust and others.

The black liquor is formed by steeping wood chips in solutions of sodium sulfide and sodium hydroxide at elevated temperatures for a period of time and subsequent removal of the cellulosic fibers. The residual liquor is dark in color due to the presence of degraded lignin. The term 'black liquor' is a consequence of this dark color. The process used to generate the black liquor is generally known as the kraft pulping process.

The degraded lignin polymers suitable for this invention are isolated from the black liquor by addition of strong acids, such as sulfuric acid, nitric acid, and hydrochloric acid; or weak acids such as acetic acid or carbonic acid. The later is achieved by injecting carbon dioxide into the black liquor. Acidification of the black liquor results in precipitation of the degraded lignin polymer, which can then be isolated by filtration. In one embodiment the pH level associated with precipitation of the degraded lignin polymer is 8-11. In another embodiment the pH level associated with precipitation of the degraded lignin polymer is 7-12.

The freshly isolated degraded lignin polymer can be washed, first with an acid, such as sulfuric acid, and then with water. This washing process helps to minimize the amount of sodium salts and carbohydrates present in the degraded lignin product. Throughout the washing process the degraded lignin product can be pressed against one or more screens in order to help remove water and contaminants. Subsequent to the washing and pressing process the water content of the degraded lignin polymer cake can be in the range of about 20-70%. The degraded lignin polymer cake can be further dried until the moisture content is in the range of 0-15%.

A degraded lignin polymer prepared in this manner is readily soluble at temperatures in excess of 60° C. in mixtures of phenol, formaldehyde, water and sufficient group 1 alkaline metal hydroxide or carbonate so that the pH value of the mixture is greater than about 7.5. Companies that manufacture degraded lignin polymer of this type include the Weyerhaeuser Company [Federal Way, Wash.] and Inventia, AB [Stockholm, Sweeden].

It is instructive to compare the degraded lignin polymer to urea. As previously stated, the key functions of urea in liquid PF resins that are used to make OSB are 1) viscosity reduction and 2) sequestering free-formaldehyde. Urea does not directly contribute to bond strength development. Thus, an aqueous solution of urea does not have any "bonding activity" in a wood gluing application. The degraded lignin polymer also has some ability to lower viscosity in a liquid PF resin, and can also sequester free-formaldehyde (at elevated pH levels). In addition, the degraded lignin polymer, which is isolated as a precipitate by acidulation of kraft liquor, has the additional benefit of being able to directly contribute to bond strength development in a wood-gluing application. The low cost and viscosity-reducing effect of the degraded lignin polymer allow it to be used as a suitable replacement for a significant portion of the urea that is normally present in a liquid PF resin that is used to make OSB, and, optionally, a replacement for some of the phenol-formaldehyde adduct. The simultaneous ability of the degraded lignin polymer to contribute directly to bond strength development allows for the additional substitution of a portion of the phenol/formaldehyde adduct which is normally present in this type of bonding resin. Normally, the phenol/formaldehyde adduct is the component in these liquid PF resins that does almost all of the actual bond formation, although the action of the alkali in this resin type on the wood also makes some measureable contribution to bond strength development. Thus, the new formulation described in this application represents a very novel approach to lowering the cost of the resin without sacrificing the bonding activity.

The resins are used to manufacture the surface layers of an oriented strand board panel or article. The method is to coat the particles or strands with a wax and mix the particles or strands with the resin so that the particles or strands will be adhered together in the final article. The particles or strands are then laid up into the article and cured under heat and pressure to form the article.

A typical oriented strand board has surface layers and core layers. The wood strands can be 25-45 mils thick, 0.25-1.5" wide, and 0.25-5.0" long. The strands are sprayed or otherwise treated with a slack wax and a resin, either a core layer resin for the core layer strands or a surface layer resin such as the present resin for the surface layer strands. The core and surface layer strands are then laid up on a caul plate and screen into a mat having outer surface layers and inner core layers. The strands in the surface layers are usually aligned along one major axis and the strands in the core layers are aligned along the other major axis.

The mat, caul plate and screen are placed in a hot press and heated and pressed to form a composite OSB panel. The surface temperature of the press platens usually is between 400 and 420° F.; the initial pressure on the mat is about 500-2200 psi; and the time in the press is around 2-5 minutes depending on the thickness of the panel. There is first phase in which the mat is compressed to its target thickness, a second phase in which the mat is maintained at its target thickness, and a third phase in which the press is opened and all external pressure on the consolidated mat is relieved. A mat will be compressed from around 3-6 inches thickness to a desired thickness such as ¾ inch.

Commercial OSB panels are usually hot at the time that they are stacked into bundles. In this configuration the elevated temperature of the OSB can persist for several days and it is common for this prolonged heat-treatment to affect some of the properties of the OSB. During this process the resin will change. The water will be removed from the resin and phenol-formaldehyde adducts will condense into larger molecules. It is possible, but not known, that some of the lignin might react with phenol-formaldehyde adducts. The pH of the wood/resin mixture is about 5.5 to 7 and at this pH level most of the phenol-formaldehyde adducts and lignin material are insoluble. During the hot-pressing process a portion of the phenol-formaldehyde adducts are converted into load-bearing solids, which effectively transfer stress between adjacent strands.

A more detailed description of a laboratory simulation of the manufacturing method is described below.

EXAMPLE 1

An experiment was conducted in order to comparatively evaluate the functional performance of the resin containing degraded lignin polymer and conventional phenolic resins that are currently used to make OSB.

A phenolic resin comprised of degraded lignin polymer and urea was prepared in the following manner:

A 4 Liter reactor was charged with a 90% phenol (aqueous (aq)) solution (1,112.8 grams (g); 10.66 moles phenol), 95% paraformaldehyde prill (843.0 g; 26.70 moles formaldehyde), water (918.0 g), degraded lignin polymer (256.7 g; 95.5% solids; supplied by Inventia, AB in Stockholm, Sweden and derived from a mixture of spruce and pine wood), and 50% sodium hydroxide (aq) solution (30.0 g). The mixture was stirred and heated to a temperature of 90° C. over a 30 minute period. The mixture was maintained at 90° C. until the viscosity of the mixture was 27 cps (as determined by use of a Brookfield Digital Viscometer, SC4-18 spindle, 25° C.).

The reactor was then charged with an additional aliquot of 50% sodium hydroxide (aq) solution (10.0 g). The mixture was then maintained at 90° C. until the viscosity of the mixture was 80 cps.

The reactor was then charged with an additional aliquot of 50% sodium hydroxide (aq) solution (15.0 g) and water (177.7 g). The mixture was then cooled to a temperature of 80° C. and maintained at 80° C. until the viscosity of the mixture was 170 cps.

The reactor was then charged with an additional aliquot of 50% sodium hydroxide (aq) solution (15.0 g) and water (177.7 g). The mixture was then cooled to a temperature of 70° C. and maintained at 70° C. until the viscosity of the mixture was 360 cps. The reaction mixture was then cooled to a temperature of 30° C.

The reactor was then charged with an additional aliquot of 50% sodium hydroxide (aq) solution (463.0 g) and urea (245.2 g). The mixture was stirred until the urea dissolved. The resulting bonding resin had a viscosity of 157 cps, pH level of 11.3, percent solids of 50.3, and a specific gravity of 1.21. The calculated percentages on a solids basis of chemicals added were: phenol/formaldehyde adduct 64.5%, sodium hydroxide 12.5%, degraded lignin 11.5%, and urea 11.5%. The resin contained any unreacted chemicals and the reaction products of these chemicals at these temperatures such as the sodium salts of the chemicals and the reaction products of urea and free formaldehyde.

A control resin was prepared in the following manner:

A 4 L reactor was charged with a 90% phenol (aq) solution (1,260.6 g; 12.08 moles phenol), 95% paraformaldehyde prill (953.1 g; 30.18 moles formaldehyde), water (1008.3 g), and 50% sodium hydroxide (aq) solution (20.1 g). The mixture was stirred and heated to a temperature of 95° C. over a 30 minute period. The mixture was maintained at 95° C. until the viscosity of the mixture was 30 cps (as determined by use of Gardner-Holdt bubble tubes, 25° C.).

The reactor was then charged with an additional aliquot of 50% sodium hydroxide (aq) solution (20.1 g). The temperature of the mixture was then reduced to 90° C. and the mixture was maintained at this temperature until the viscosity of the mixture was 80 cps.

The reactor was then charged with an additional aliquot of 50% sodium hydroxide (aq) solution (40.3 g) and water (201.3 g). The mixture then was then cooled to a temperature of 80° C. and maintained at 80° C. until the viscosity of the mixture was 170 cps.

The reactor was then charged with an additional aliquot of 50% sodium hydroxide (aq) solution (40.3 g) and water (201.3 g). The mixture then was then cooled to a temperature of 70° C. and maintained at 70° C. until the viscosity of the mixture was 660 cps. The reaction mixture was then cooled to a temperature of 30° C.

The reactor was then charged with an additional aliquot of 50% sodium hydroxide (aq) solution (181.1 g) and urea (510.2 g). The mixture was stirred until the urea dissolved. The resulting bonding resin had a viscosity of 148 cps, pH level of 10.6, percent solids of 50.1, and a specific gravity of 1.21. The calculated percentages on a solids basis of chemicals added were: phenol/formaldehyde adduct 70.3%, sodium hydroxide 6.7%, and urea 23.0%. The resin contained any unreacted chemicals and the reaction products of these chemicals at these temperatures such as the sodium salts of the chemicals.

Oriented strandboard (OSB) was produced on a laboratory-scale in the following manner.

Wooden strands (25-45 mils thick, 0.25-1.5" wide, 0.25-5.0" long, aspen and poplar species) designated as "core-layer strands" were dried to a moisture content of about 6% and were then transferred into a front-load, cylindrical-shaped "blender" compartment.

The front load, cylindrical-shaped "blender" in this and the following examples had a 2' depth, and a 6' diameter. The axis of rotation of the blender was approximately parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins.

The slack wax used was 431B manufactured by the International Group Incorporated in Toronto, Ontario, Canada. It was heated to a temperature of 225° F. and then sprayed onto the wooden strands at a loading level of 0.75% based on the dry mass of the wood. This temperature and loading level was used throughout the examples.

The isocyanate-based bonding resin used throughout the examples was Rubinate 1840 manufactured by Huntsman Polyurethanes in The Woodlands, Tex. It was sprayed onto the wax-treated strands in the revolving blender at a loading level of 6.0% based on the dry mass of the wood. This loading level was used throughout the examples.

The treated core-layer strands were then removed from the blender.

Additional wooden strands (25-45 mils thick, 0.25-1.5" wide, 0.25-5.0" long, aspen and poplar species) designated as "surface-layer strands" were dried to a moisture content of about 3% and were then loaded into the blender compartment.

The surface strands were treated in the blender with the 431B slack wax as described above.

Phenolic bonding resin (either (1) the degraded lignin-containing resin or (2) the laboratory control resin or (3) a commercially available phenolic bonding resin for OSB applications, 70CR66 produced by the Georgia-Pacific Chemicals LLC in Decatur, Ga.) was then sprayed onto the strands at a loading level of 4.0% based on the solids content of the resin and the dry mass of the wood.

The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one major axis of the mat, while the strands in the core layers were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an 'open' hot-press. The top and bottom platens were maintained at a surface temperature of 410° F. A control system was immediately activated in order to begin closing the gap between the top and bottom platens of the hot-press until the distance between them was 0.719". The time required to achieve this compression process was about 60 seconds. The maximum pressure exerted on the mat was about 500-650 psi. The gap between the platens was maintained at 0.719" for a period of 190 seconds and was then increased to 0.749" over a period of 30 seconds. The gap between the platens was then rapidly opened and the resulting, consolidated OSB panel was removed from the press. Under the hot-pressing conditions a portion of the resin was converted into a load-bearing solid, which had the ability to transfer stresses between adjacent strands. When lignin was present it appeared to contribute to the bond strength of the OSB, although it was unknown as to whether or not any of the lignin reacted with the phenol-formaldehyde adducts.

In an attempt to simulate the hot-stacking process associated with commercial production of OSB the hot OSB laboratory panel was transferred into an oven which was maintained at a temperature of 80° C., and the panel remained in the oven for a period of 24 hours. The panel was then removed from the oven and placed into a conditioning chamber which was maintained at a relative humidity of 50% and a temperature of 20° C. The panel remained in the conditioning chamber for at least one week.

Six replicate panels were made in this manner for each of the surface layer bonding resin types. Six test specimens (2"×2") were cut from each conditioned laboratory panel. Each test specimen was subjected to an 'as-is' internal bond strength test in accordance with ASTM D1037. Test results are shown in Table 1.

TABLE 1

Test values for OSB made with experimental and control phenolic resin in the surface layers

| SURFACE LAYER LIQUID PF RESIN | AVERAGE INTERNAL BOND STRENGTH (PSI) |
|---|---|
| Experimental (11.5% degraded lignin & 11.5% urea) | 84.8 |
| Lab Control (23.0% urea) | 81.8 |
| 70CR66 produced by Georgia-Pacific Chemicals LLC | 84.3 |

Note:
the failure mode (break location) of the test specimens was almost exclusively in the surface layer of the OSB for each of the three different resins.

The test results shown in Table 1 help to demonstrate the functional performance of the invented resin in an OSB application. The internal bonding strength of the resin containing degraded lignin was comparable to the control resin containing urea and no degraded lignin or the Georgia Pacific commercial control resin.

EXAMPLE 2

An experiment was conducted in order to demonstrate the feasibility of the resin synthesis when an alternative degraded lignin polymer was used.

A phenolic resin comprised of degraded lignin polymer and urea was prepared in the following manner.

A 4 L reactor was charged with a 90% phenol (aq) solution (906.0 g; 8.68 moles phenol), 95% paraformaldehyde prill (794.4 g; 25.16 moles formaldehyde), water (686.0 g), degraded lignin polymer (390.1 g; 87.7% solids; supplied by the Weyerhaeuser Company in Federal Way, Wash. and derived from southern yellow pine wood), and 50% sodium hydroxide (aq) solution (30.0 g). The mixture was stirred and heated to a temperature of 90° C. over a 30 minute period. The mixture was maintained at 90° C. until the viscosity of the mixture was 60 cps (as determined by use of a Brookfield Digital Viscometer, SC4-18 spindle, 25° C.).

The reactor was then charged with an additional aliquot of 50% sodium hydroxide (aq) solution (15.0 g) and water (174.0 g). The mixture was then cooled to a temperature of 85° C. and maintained at 85° C. until the viscosity of the mixture was 170 cps.

The reactor was then charged with an additional aliquot of 50% sodium hydroxide (aq) solution (15.0 g) and water (213.2 g). The mixture was then cooled to a temperature of 80° C. and maintained at 80° C. until the viscosity of the mixture was 480 cps.

The reactor was then charged with an additional aliquot of 50% sodium hydroxide (aq) solution (300.0 g). The mixture was then cooled to a temperature of 70° C. and maintained at 70° C. until the viscosity of the mixture was 800 cps. The reaction mixture was then cooled to a temperature of 30° C.

The reactor was then charged with an additional aliquot of 50% sodium hydroxide (aq) solution (320.0 g) and urea (319.2 g). The mixture was stirred until the urea dissolved. The resulting bonding resin had a viscosity of 295 cps, pH level of 12.3, percent solids of 52.0, and a specific gravity of 1.21. The calculated percentages on a solids basis of chemicals added were: phenol/formaldehyde adduct 53.8%, sodium hydroxide 15.7%, degraded lignin 15.8%, and urea 14.7%. The resin contained any unreacted chemicals and the reaction products of the chemicals at these temperatures such as the sodium salts of the chemicals and the reaction product of urea and free formaldehyde.

EXAMPLE 3

An experiment was conducted in order to comparatively assess the shelf-life of the resin associated with the present invention and conventional phenolic resins that are currently used to make OSB.

A phenolic resin comprised of degraded lignin polymer and urea was prepared as described in example 1. A laboratory control resin was also prepared as described in example 1. Lastly, a commercially available phenolic resin, known as 155C42 and developed for use in OSB, was provided by Georgia-Pacific Chemicals LLC (Decatur, Ga.).

Each of these resins was stored at a temperature of about 25° C. and periodically measured for viscosity by use of a Brookfield Digital Viscometer, SC4-18 spindle, 25° C.

Figure 1:
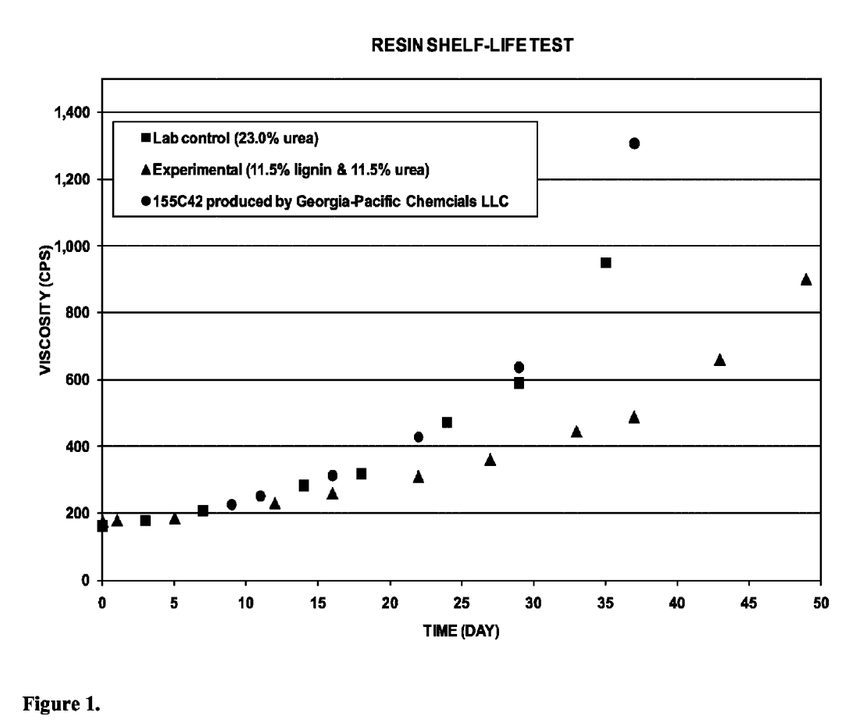
FIG. 1 is a graph of a resin shelf test.

The viscosity results are shown in FIG. 1 and illustrate that at equivalent storage conditions the resin incorporating degraded lignin increases in viscosity at a rate that is slower than that of a conventional phenolic resin for an OSB bonding resin application.

EXAMPLE 4

An experiment was conducted in order to comparatively assess the emission potential of the resin incorporating degraded lignin and conventional phenolic resins that are currently used to make OSB.

A phenolic resin comprised of degraded lignin polymer and urea was prepared in the following manner.

A 4 L reactor was charged with a 90% phenol (aq) solution (906.0 g; 8.68 moles phenol), 95% paraformaldehyde prill (137.0 g; 4.34 moles formaldehyde), water (720.0 g), degraded lignin polymer (356.4 g; 96.0% solids; supplied by Inventia, AB in Stockholm, Sweden and derived from a mixture of spruce and pine wood), and 50% sodium hydroxide (aq) solution (25.0 g). The mixture was stirred and heated to a temperature of 90° C. over a 30 minute period. The mixture was maintained at 90° C. for a period of 20 minutes.

The reactor was then charged 95% paraformaldehyde (137.0 g; 4.34 moles formaldehyde) and 50% sodium hydroxide (2.0 g). The mixture was maintained at 90° C. for a period of 20 minutes. This process was repeated three additional times for a total of four charges.

The reactor was then charged 95% paraformaldehyde (109.4 g; 3.46 moles formaldehyde) and 50% sodium hydroxide (2.0 g). The mixture was then maintained at 90° C. until the viscosity of the mixture was 60 cps (as determined by use of a Brookfield Digital Viscometer, SC4-18 spindle, 25° C.).

The reactor was then charged with an additional aliquot of 50% sodium hydroxide (aq) solution (10.0 g) and water (174.0 g). The mixture was then cooled to a temperature of 85° C. and maintained at 85° C. until the viscosity of the mixture was 170 cps.

The reactor was then charged with an additional aliquot of 50% sodium hydroxide (aq) solution (15.0 g) and water (213.2 g). The mixture was then cooled to a temperature of 80° C. and maintained at 80° C. until the viscosity of the mixture was 480 cps.

The reactor was then charged with an additional aliquot of 50% sodium hydroxide (aq) solution (300.0 g). The mixture was then cooled to a temperature of 70° C. and maintained at 70° C. until the viscosity of the mixture was 800 cps. The reaction mixture was then cooled to a temperature of 30° C.

The reactor was then charged with an additional aliquot of 50% sodium hydroxide (aq) solution (320.0 g) and urea (319.2 g). The mixture was stirred until the urea dissolved. The resulting bonding resin had a final viscosity of 270 cps, pH level of 12.3, percent solids of 51.9, and a specific gravity of 1.21. The calculated percentages on a solids basis of chemicals added were: phenol/formaldehyde adduct 53.8%, sodium hydroxide 15.7%, degraded lignin 15.8%, and urea 14.7%. The resin contained any unreacted chemicals and the reaction products of these chemicals at these temperatures such as the sodium salts of the chemicals and the reaction product of urea and free formaldehyde.

A control resin was prepared in the following manner:

A 4 L reactor was charged with a 90% phenol (aq) solution (1,036.0 g; 9.92 moles phenol), 95% paraformaldehyde prill (908.6 g; 28.77 moles formaldehyde), water (651.0 g), and 50% sodium hydroxide (aq) solution (10.5 g). The mixture was stirred and heated to a temperature of 95° C. over a 30 minute period. The mixture was maintained at 95° C. until the viscosity of the mixture was 30 cps (as determined by use of Gardner-Holdt bubble tubes, 25° C.).

The reactor was then charged with an additional aliquot of 50% sodium hydroxide (aq) solution (10.5 g). The temperature of the mixture was maintained at 95° C. until the viscosity of the mixture was 80 cps.

The reactor was then charged with an additional aliquot of 50% sodium hydroxide (aq) solution (10.5 g) and water (140.0 g). The mixture was then cooled to a temperature of 85° C. and maintained at 85° C. until the viscosity of the mixture was 170 cps.

The reactor was then charged with an additional aliquot of 50% sodium hydroxide (aq) solution (10.5 g) and water (248.8 g). The mixture was then cooled to a temperature of 75° C. and maintained at 75° C. until the viscosity of the mixture was 660 cps.

The reactor was then charged with an additional aliquot of 50% sodium hydroxide (aq) solution (280.0 g). The mixture was then cooled to a temperature of 70° C. and maintained at 70° C. until the viscosity of the mixture was 2,120 cps. The reaction mixture was then cooled to a temperature of 30° C.

The reactor was then charged with an additional aliquot of 50% sodium hydroxide (aq) solution (269.0 g) and urea (478.8 g). The mixture was stirred until the urea dissolved. The resulting bonding resin had a viscosity of 310 cps, pH level of 12.4, percent solids of 51.8, and a specific gravity of 1.21. The calculated percentages on a solids basis of chemicals added were: phenol/formaldehyde adduct 63.3%, sodium hydroxide 14.0%, and urea 22.7%. The resin contained any unreacted chemicals and the reaction products of the chemicals at these temperatures such as the sodium salts of the chemicals and the reaction product of urea and free formaldehyde.

An aliquot of each resin was subjected to a specific heating process in a distillation apparatus. The distillate was collected in five fractions and each of these was assayed for ammonia, formaldehyde, phenol, methanol, and sulfur levels.

Samples of 132C08 PF resin from Georgia-Pacific Chemicals LLC [Decatur, Ga.], which is a conventional core-layer phenol-formaldehyde resin, were also subjected to the emissions test.

Figure 2:
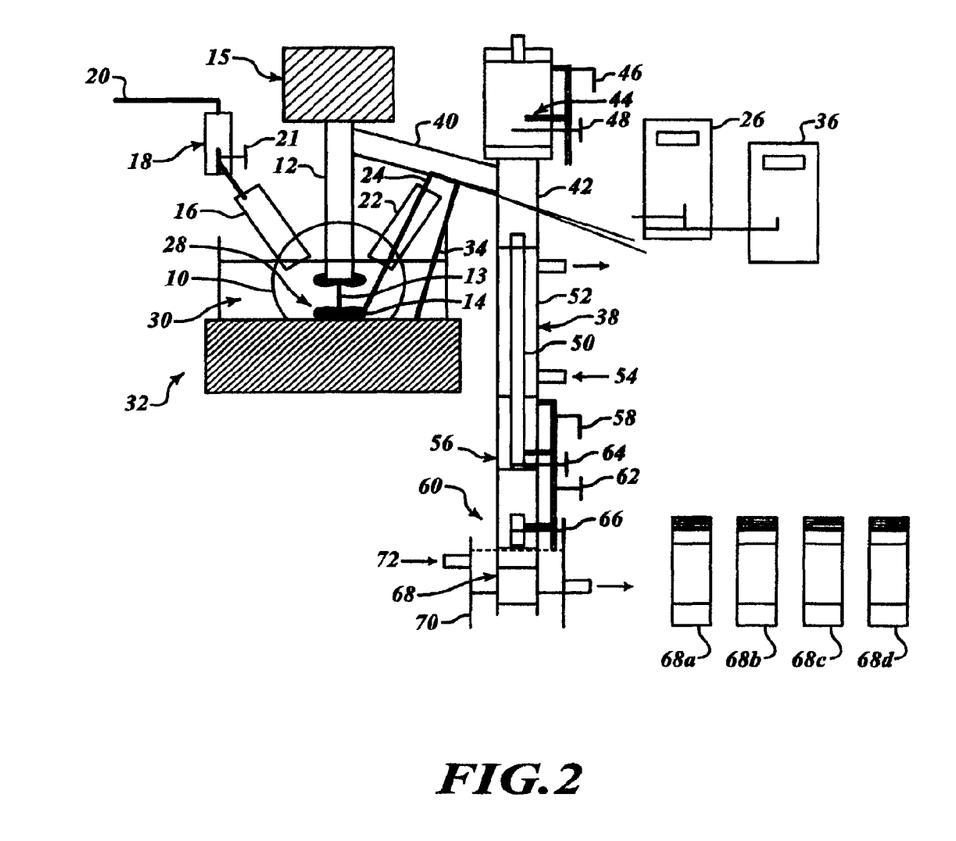
FIG. 2 is a diagram of a distillation apparatus.

The distillation apparatus used to conduct these tests is depicted in FIG. 2.

The distillation apparatus has a three-necked 1 L round bottom flask 10. The center neck 12 contains a rod 13 connecting a rotating paddle 14 in the flask 10 to a stirring motor 15 for rotating the paddle 14. One side neck 16 is an air inlet to the flask 10. An air flow meter 18 is attached to the tube 20 carrying air to the flask 10. There is an air inlet valve 21 in the tube 20. The other side neck 22 is an inlet for the thermal probe 24 connected to thermometer 26. The probe 24 and thermometer 26 measure the temperature of the solution 28 in the flask 10. The solution is described below.

The flask 10 sits in a hot oil bath 30 which is heated by a heater 32. A temperature probe 34 connected to a thermometer 36 measures the temperature of the hot oil bath. The oil bath is agitated by a magnetic stirring bar.

The center neck 12 of the flask 10 is also a passage for carrying the distillate from flask 10 to the condenser column 38. The passage has a side arm 40 connecting the flask 10 to the distillate collector section 42 of the condenser column 38.

The condenser column 38 has an upper addition funnel 44 having a side-arm valve 46. The funnel 44 is connected to the distillate collector section 42 so that liquid from the funnel 44 may pass into the distillate collector section 42. There is an outlet valve 48 between the funnel 44 and the collector section 42 to control the flow of fluids between the funnel 44 and the collector section 42.

A passage 50 from the collector section 42 passes through the condenser 52 and cold water 54 in the condenser 52 condenses the distillate in the passage 50 from the flask 10 into a liquid. The liquid from the condenser 52 passes into a first lower addition funnel 56, which has a side arm valve 58, and a second lower addition funnel 60, which has a side arm valve 62. There is an outlet valve 64 between funnels 56 and 60 to control the flow of liquid from funnel 56 to funnel 60, and an outlet valve 66 on the outlet of funnel 60 to control the flow of liquid from funnel 60.

A distillate collection vial 68e is below the outlet of funnel 60 to collect a sample. The flask 68 is in a cold water bath 70. Cold water is supplied at 72. Several collected samples, 68a-d, are illustrated.

Set Up:
1. A new 3-necked 1 L round bottom flask 10 was washed with hot water and detergent and then rinsed with acetone. The flask 10 was dried with air before proceeding to the next step.
2. The clean flask 10 was weighed and then charged with a solution 28 comprising test materials (5.0 g), deionized water (250.0 g) and Dow-Corning 200 Fluid 200 cs (250.0 g) [obtained from Dow-Corning; Midland, Mich.]. The total mass of the loaded flask was measured.
3. The loaded flask was installed into the fractional distillation apparatus shown in FIG. 2. All joints were checked to ensure that they were tight. The contents of the flask were vigorously stirred by use of the rotating paddle 14 at a rate of about 100-300 rpm. This stirring rate was sufficient to thoroughly homogenize the contents of the flask and also provided excellent transfer of heat between the flask surface and the oil bath 30. There was no initial air-flow into the flask. The oil in the heating bath had an initial temperature of about 23° C. and was agitated with a magnetic stirring bar 31.
4. The first distillate collection vial 68 (4 oz capacity) was labeled, tarred on a balance, and then positioned in the cold water bath 70 beneath the two lower addition funnels 56 and 60. The temperature of the water bath was maintained at about 13-15° C. The side-arm valves 58 and 62 on the lower addition funnels were initially kept in an open position.
5. The outlet valve 48 and the side-arm valve 46 on the upper addition funnel 44 were initially kept in a closed position. The upper addition funnel 44 was not initially charged with water.
6, Cold water 54 was circulated through the jacket of the condenser 52.

Run:
1. The heater 32 beneath the oil bath 30 was turned on at about 100% power and the stirring bar 31 was activated. The temperature of the oil bath 30 and the flask contents 28 were measured and recorded every 2.5 minutes throughout the duration of the run.
2. When the temperature of the oil bath 30 was about 190-220° C., the heating power was reduced to about 60-80%. For most samples an attempt was made to maintain the temperature of the oil bath 30 in the range of 210-220° C. until the contents 28 of the round bottom flask had dehydrated.
3. In all runs the temperature of the round bottom flask contents 28 increased to about 101° C. during the first 22 minutes. A temperature of about 101-110° C. was then spontaneously maintained for an extended period of time. In most runs the first drop of condensate was observed at about 24-25 minutes.
4. The rate of condensation for the portion of the run subsequent to collection of the first drop of condensate and prior to the sample dehydration point was about 3-5 mL/minute. The appearance of the flask contents was observed and recorded throughout each run.
5. An attempt was made to obtain a collection volume for each distillate fraction of about 55-60 mL, which required about 15-20 minutes of run time. When a collection vial 68 had been filled with about 55-60 mL of distillate, the following steps were used to isolate and secure the fraction. First, the outlet valve 66 of the bottom, lower addition funnel 60 was closed. Second, the collection vial 68 was carefully removed from the cold water bath 70 and wiped dry with a towel. The loaded vial 68 was then weighed in order to determine the amount of distillate collected. The vial 68 was then capped. A fresh collection vial was then labeled, tarred and positioned into the cold water bath 70 beneath the bottom, lower addition funnel 60. The outlet valve 66 on this lower addition funnel 60 was then opened. The collection time and mass of each fraction were recorded.

6. Eventually, in each run the temperature of the flask contents 28 would begin to rise at a rate of about 1° C./minute. At this point in time cold water (250.0 g) was loaded into the upper addition funnel 44. The fourth collection vial 68d was replaced with the fifth collection vial 68e, which had an 8-oz volume. The upper addition funnel 44 was capped on top and the side valve 46 was opened. The outlet valve 48 was partially opened in order to yield a flow rate out of the upper addition funnel of about 10-15 mL/minute. The side valves 58 and 62 on the lower addition funnels were both closed and the air-inlet valve 21 attached to the distillation flask was opened. The flow rate of air into the distillation flask was maintained at about 115-120 mL/minute and was gauged by use of the flow meter 18. When the air flow was initiated, the temperature of the flask contents would immediately begin to increase at a rate of about 8° C./minute. The heater 32 for the oil bath 30 was adjusted to 100% power.

7. The temperature of the flask contents 28 was allowed to rise to a temperature of 220° C. As soon as this critical temperature was reached, the oil bath heater 32 was turned off and the run was stopped on the next 2.5 minute interval. The air flow into the distillation flask 10 and the water flow from the upper addition funnel 44 were both shut off during the final 30 s of each run.

8. At the end of the run the fifth fraction sample 68e was isolated and weighed as previously described. The residual amount of water in the upper addition funnel 44 was measured and this information was used to determine the amount of water from this funnel that had been added to the fifth fraction. The hot oil bath 30 was lowered and moved to another storage location. The distillation flask 10 was isolated from the apparatus. The thermal probe 24 and the stirring paddle 14 were removed from the distillation flask 10. An attempt was made to leave as much of the flask residue in the distillation flask as possible. Flask content losses were estimated to be less than 1 g. The mass of the distillation flask plus the residue was measured and compared to the initial mass of the fully loaded distillation flask. In this manner we were able to estimate the amount of flask content that was transferred out of the distillation flask during the run. This value was compared to the sum of the collected fractions in order to calculate the yield for the run.

Figure 3:
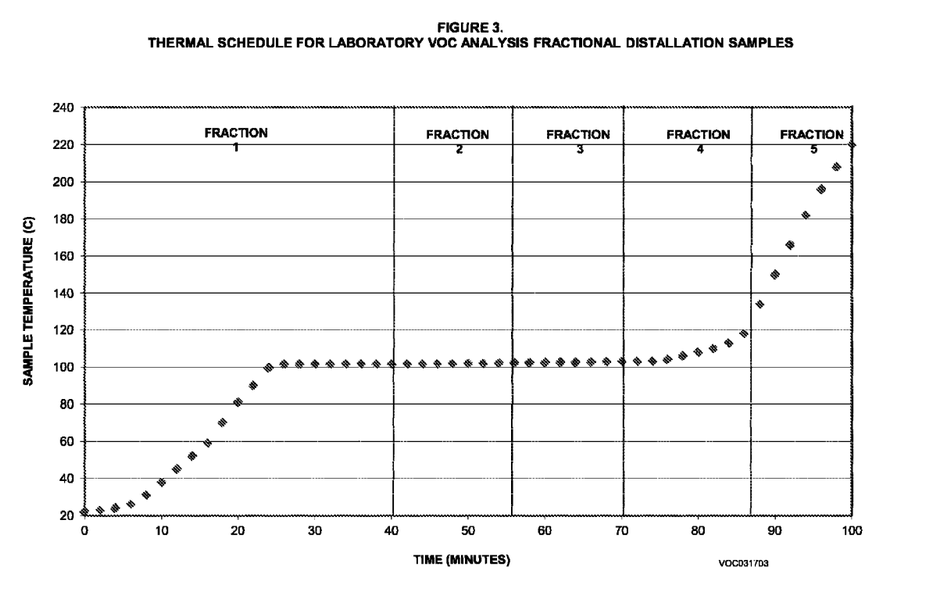
FIG. 3 is a graph of a time-temperature schedule for a distillation run.

FIG. 3 shows a typical time versus temperature schedule for a distillation run.

Again, collected fractions were quantitatively assayed for ammonia, formaldehyde, phenol, sulfur and methanol. The ammonia level was determined by use of EPA method 350.1 (colorimetric indophenol method). The formaldehyde level was determined by a modified version of ASTM D6303 (colorimetric 3,5-diacetyl-1,4-dihydro-lutidine method). The phenol level was determined by use of HPLC (EPA method 604). The sulfur level was determined by use of ASTM D1552. The methanol level was determined by use of NCASI 94.03.

Prior to evaluation of resin samples, recovery studies were conducted using standard solutions of water, phenol, methanol, ammonia and formaldehyde that were processed through the distillation system. The average results of these recovery studies are shown in Tables 2 through 6.

Water Recovery Study

The distillation flask was charged with deionized water (255.0 g) and Dow-Corning 200 Fluid 200 cs (250.0 g) and subjected to the standard distillation process. The quantitation limit for each analyte was ammonia (0.05 ppm), formaldehyde (0.1 ppm), phenol (5 ppb), methanol (0.4 ppm) and sulfur (50 ppm). The results are shown in Table 2.

TABLE 2

Water recovery study

| Recovered ammonia (mg) | Recovered formaldehyde (mg) | Recovered phenol (mg) | Recovered methanol (mg) | Recovered sulfur (mg) | Percent total mass yield |
|---|---|---|---|---|---|
| 0.0 | 0.0 | 0.0 | 0.0 | 0 | 98.3 |

Ammonia Recovery Study

For each run the distillation flask was charged with deionized water (250 g), Dow-Corning 200 Fluid 200 cs (250 g) and ammonia solution (5.0 g; 7,900 ppm) and subjected to the standard distillation process. The results are shown in Table 3.

TABLE 3

Ammonia recovery study

| Loaded ammonia (mg) | Recovered ammonia level (mg) | Percent recovery for ammonia | Percent total mass yield |
|---|---|---|---|
| 39.5 | 35.8 | 90.6 | 98.1 |

Formaldehyde Recovery Study

For each run the distillation flask was charged with deionized water (250 g), Dow-Corning 200 Fluid 200 cs (250 g) and formaldehyde solution (5.0 g; 10,300 ppm) and subjected to the standard distillation process. The results are shown in Table 4.

TABLE 4

Formaldehyde recovery study

| Loaded formaldehyde (mg) | Recovered formaldehyde (mg) | Percent recovery for formaldehyde | Percent total mass yield |
|---|---|---|---|
| 51.5 | 50.2 | 97.5 | 98.4 |

Phenol Recovery Study

For each run the distillation flask was charged with deionized water (250 g), Dow-Corning 200 Fluid 200 cs (250 g) and phenol solution (5.0 g; 6,800 ppm) and subjected to the standard distillation process. The results are shown in Table 5.

TABLE 5

Phenol recovery study

| Loaded phenol (mg) | Recovered phenol (mg) | Percent recovery for phenol | Percent total mass yield |
|---|---|---|---|
| 34.0 | 31.0 | 91.0 | 98.3 |

Methanol Recovery Study

For each run the distillation flask was charged with deionized water (250 g), Dow-Corning 200 Fluid 200 cs (250 g) and methanol solution (5.0 g; 10,000 ppm) and subjected to the standard distillation process. The results are shown in Table 7.

TABLE 6

Methanol recovery study

| Loaded methanol (mg) | Recovered methanol (mg) | Percent recovery for methanol | Percent total mass yield |
|---|---|---|---|
| 50.0 | 49.4 | 98.8 | 97.9 |

For each run the distillation flask was charged with deionized water (250 g), Dow Corning 200 Fluid 200 cs (250 g) and either the experimental resin, the Lab Control resin or 132CO8 resin (5 g) and subjected to the standard distillation process. The results of the resin emission tests are shown in Table 7.

TABLE 7

Resin emission results*

| RESIN | AMMO-NIA | FORMAL-DEHYDE | PHE-NOL | METHA-NOL | SUL-FUR |
|---|---|---|---|---|---|
| Experimental (15.8% degraded lignin & 14.7% urea) | 3.64 | 1.42 | 0.01 | 0.49 | 0.0 |
| Lab Control (22.7% urea) | 5.81 | 1.21 | 0.00 | 0.62 | 0.0 |
| 132C08 produced by Georgia-Pacific Chemicals LLC | 6.58 | 1.32 | 0.01 | 2.31 | 0.0 |

*Note: emission results are expressed as grams of emission per 100 grams of resin solids.

The data shown in Table 7 provide a clear indication that the resin of the present invention is associated with lower ammonia emissions compared to that of conventional resins that are targeted for use in an OSB bonding application.

EXAMPLE 5

An exercise was conducted in order to demonstrate the "bonding activity" of the degraded lignin polymer.

Three different aqueous solutions were prepared.

The first was a 1% sodium hydroxide solution, which was made by diluting a 50% sodium hydroxide solution (5.0 g) to a volume of 500 mL with water. The pH level of this solution was 13.7.

The second solution was a degraded lignin solution, which was made by dissolving degraded lignin polymer (125.0 g; 96.0% solids; supplied by Inventia, AB in Stockholm, Sweden and derived from a mixture of spruce and pine wood) in a hot (80° C.) mixture of water (468 g) and 50% sodium hydroxide (aq) solution (12.0 g). The pH level of this solution was 9.1. A portion of the degraded lignin solution (10.0 g) was combined with a 50% sodium hydroxide solution (0.8 g) to yield a new degraded lignin solution which had a pH level of 13.6.

The third solution was a commercial liquid PF resin, known as 155C42 produced by Georgia-Pacific Chemicals LLC. Decatur, Ga., that was diluted with water until it had a solids content of 20%.

These three different solutions were comparatively evaluated for their ability to induce shear strength in 2-ply laminates in a laboratory-scale Automatic Bond Evaluation System (ABES), which was manufactured by Adhesive Evaluation Systems, Incorporated, Corvallis, Oreg. The wood substrate used in this test was white poplar strands (120 mm long, 20 mm wide, 1 mm thick). Adhesive was applied to one side of one end of a strand over an area of 20 mm wide×5 mm long. The end of a second strand was overlapped with the adhesive-treated area of the first strand. The overlapping area of the two strands was then pressed between two heated platens for a period of either 30, 60, 90, 120 or 150 s. The platen temperature was 120° C. and the pressure setting was 30 psi. The resulting laminate was immediately pulled to failure in a shear mode. The force (N) required to break the bond was measured and recorded. The level of replication for each measurement was 5. The average results of these tests are shown in FIG. 4.

Figure 4:
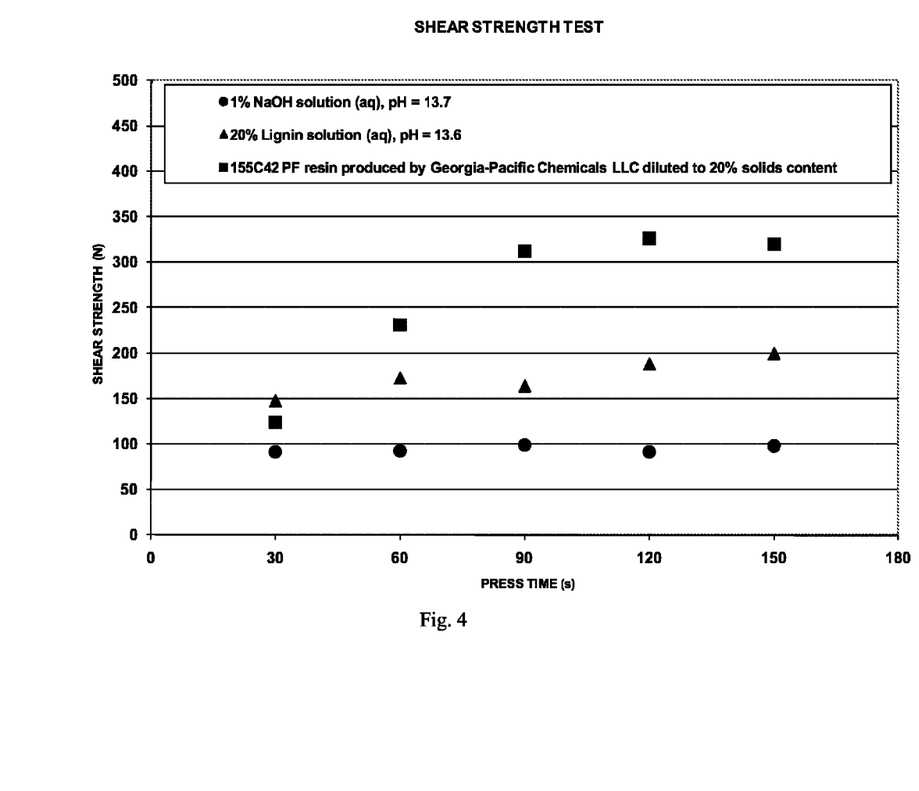
FIG. 4 is a graph of a shear strength test.

The test results shown in FIG. 4 demonstrate a significant level of "bonding activity" in the degraded lignin aqueous solution.

EXAMPLE 6

An experiment was conducted in order to comparatively evaluate the effect of the degraded lignin polymer level on the functional performance of the resin in an OSB application.

5.0% Degraded Lignin Polymer Phenolic Resin:

A phenolic resin comprised of degraded lignin polymer and urea was prepared in the following manner:

A 4 L reactor was charged with a 90% phenol (aq) solution (1,112.8 g; 10.66 moles phenol), 95% paraformaldehyde prill (843.0 g; 26.70 moles formaldehyde), water (835.0 g), degraded lignin polymer (166.5 g; 60.3% solids; supplied by the Weyerhaeuser Company in Federal Way, Wash. and derived from southern yellow pine wood), and 50% sodium hydroxide (aq) solution (20.0 g). The mixture was stirred and heated to a temperature of 95° C. over a 30 minute period. The mixture was maintained at 95° C. until the viscosity of the mixture was 30 cps (as determined by use of a Brookfield Digital Viscometer, SC4-18 spindle, 25° C.).

The reactor was then charged with an additional aliquot of 50% sodium hydroxide (aq) solution (10.0 g). The mixture was then maintained at 95° C. until the viscosity of the mixture was 80 cps.

The reactor was then charged with an additional aliquot of 50% sodium hydroxide (aq) solution (10.0 g) and water (177.7 g). The mixture was then cooled to a temperature of 85° C. and maintained at 85° C. until the viscosity of the mixture was 300 cps.

The reactor was then charged with an additional aliquot of 50% sodium hydroxide (aq) solution (10.0 g) and water (177.7 g). The mixture was then cooled to a temperature of 75° C. and maintained at 75° C. until the viscosity of the mixture was 700 cps. The reaction mixture was then cooled to a temperature of 30° C.

The reactor was then charged with an additional aliquot of 50% sodium hydroxide (aq) solution (291.5 g) and urea (361.5 g). The mixture was stirred until the urea dissolved. The resulting bonding resin had a viscosity of 184 cps, pH level of 10.9, percent solids of 50.4, and a specific gravity of 1.21. The calculated percentages on a solids basis of chemicals added were: phenol/formaldehyde adduct 68.5%, sodium hydroxide 8.5%, degraded lignin 5.0%, and urea 18.0%. The resin contained any unreacted chemicals and the reaction products of these chemicals at these temperatures such as the sodium salts of the chemicals and the reaction products of urea and free formaldehyde.

11.5% Degraded Lignin Polymer Phenolic Resin:

A phenolic resin comprised of degraded lignin polymer and urea was prepared in the following manner:

A 4 L reactor was charged with a 90% phenol (aq) solution (1,112.8 g; 10.66 moles phenol), 95% paraformaldehyde prill (843.0 g; 26.70 moles formaldehyde), water (768.0 g), degraded lignin polymer (406.5 g; 60.3% solids; supplied by the Weyerhaeuser Company in Federal Way, Wash. and derived from southern yellow pine wood), and 50% sodium hydroxide (aq) solution (30.0 g). The mixture was stirred and heated to a temperature of 90° C. over a 30 minute period. The mixture was maintained at 90° C. until the viscosity of the mixture was 30 cps (as determined by use of a Brookfield Digital Viscometer, SC4-18 spindle, 25° C.).

The reactor was then charged with an additional aliquot of 50% sodium hydroxide (aq) solution (10.0 g). The mixture was then maintained at 90° C. until the viscosity of the mixture was 80 cps.

The reactor was then charged with an additional aliquot of 50% sodium hydroxide (aq) solution (15.0 g) and water (177.7 g). The mixture was then cooled to a temperature of 80° C. and maintained at 80° C. until the viscosity of the mixture was 170 cps.

The reactor was then charged with an additional aliquot of 50% sodium hydroxide (aq) solution (15.0 g) and water (177.7 g). The mixture was then cooled to a temperature of 70° C. and maintained at 70° C. until the viscosity of the mixture was 360 cps. The reaction mixture was then cooled to a temperature of 30° C.

The reactor was then charged with an additional aliquot of 50% sodium hydroxide (aq) solution (462.8 g) and urea (245.2 g). The mixture was stirred until the urea dissolved. The resulting bonding resin had a viscosity of 179 cps, pH level of 11.4, percent solids of 50.5, and a specific gravity of 1.22. The calculated percentages on a solids basis of chemicals added were: phenol/formaldehyde adduct 64.5%, sodium hydroxide 12.5%, degraded lignin 11.5%, and urea 11.5%. The resin contained any unreacted chemicals. and the reaction products of these chemicals at these temperatures such as the sodium salts of the chemicals and the reaction products of urea and free formaldehyde.

19.7% Degraded Lignin Polymer Phenolic Resin:

A phenolic resin comprised of degraded lignin polymer and urea was prepared in the following manner:

A 4 L reactor was charged with a 90% phenol (aq) solution (1,112.8 g; 10.66 moles phenol), 95% paraformaldehyde prill (843.0 g; 26.70 moles formaldehyde), water (703.0 g), degraded lignin polymer (735.0 g; 60.3% solids; supplied by the Weyerhaeuser Company in Federal Way, Wash. and derived from southern yellow pine wood), and 50% sodium hydroxide (aq) solution (50.0 g). The mixture was stirred and heated to a temperature of 90° C. over a 30 minute period. The mixture was maintained at 90° C. until the viscosity of the mixture was 80 cps (as determined by use of a Brookfield Digital Viscometer, SC4-18 spindle, 25° C.).

The reactor was then charged with an additional aliquot of 50% sodium hydroxide (aq) solution (15.0 g) and water (177.7 g). The mixture was then cooled to a temperature of 85° C. and maintained at 85° C. until the viscosity of the mixture was 170 cps.

The reactor was then charged with an additional aliquot of 50% sodium hydroxide (aq) solution (15.0 g) and water (177.7 g). The mixture was then cooled to a temperature of 75° C. and maintained at 75° C. until the viscosity of the mixture was 360 cps. The reaction mixture was then cooled to a temperature of 30° C.

The reactor was then charged with an additional aliquot of 50% sodium hydroxide (aq) solution (548.5 g) and urea (112.5 g). The mixture was stirred until the urea dissolved. The resulting bonding resin had a viscosity of 290 cps, pH level of 11.6, percent solids of 50.0, and a specific gravity of 1.22. The calculated percentages on a solids basis of chemicals added were: phenol/formaldehyde adduct 61.3%, sodium hydroxide 14.0%, degraded lignin 19.7%, and urea 5.0%. The resin contained any unreacted chemicals and the reaction products of these chemicals at these temperatures such as the sodium salts of the chemicals and the reaction products of urea and free formaldehyde.

Oriented strandboard (OSB) was produced on a laboratory-scale in the following manner.

Wooden strands (25-45 mils thick, 0.25-1.5" wide, 0.25-5.0" long, aspen and poplar species) designated as "core-layer strands" were dried to a moisture content of about 6% and were then transferred into the front-load, cylindrical-shaped "blender" compartment described above.

A slack wax, ProWax 561 manufactured by the ExxonMobil Chemical Company; Houston, Tex., USA, was heated to a temperature of 225° F. and then sprayed onto the wooden strands in the revolving blender at a loading level of 0.75% based on the dry mass of the wood. An isocyanate-based bonding resin, Rubinate 1840 described above was then sprayed onto the wax treated strands in the revolving blender at a loading level of 6.0% based on the dry mass of the wood. The treated core-layer strands were then removed from the blender.

Additional wooden strands (25-45 mils thick, 0.25-1.5" wide, 0.25-5.0" long, aspen and poplar species) designated as "surface-layer strands" were dried to a moisture content of about 3% and were then loaded into the blender compartment.

ProWax 561 slack wax was heated to a temperature of 225° F. and then sprayed onto the wooden strands in the revolving blender at a loading level of 0.75% based on the dry mass of the wood.

Phenolic bonding resin (either the degraded lignin-containing resin or a commercially available 155C42 phenolic bonding resin described above was then sprayed onto the strands at a loading level of 4.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the surface layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an 'open' hot-press. The top and bottom platens were maintained at a surface temperature of 410° F. A control system was immediately activated in order to begin closing the gap between the top and bottom platens of the hot-press until the distance between them was 0.719". The time required to achieve this compression process was about 60 seconds. The maximum pressure exerted on the mat was about 500-650 psi. The gap between the platens was maintained at 0.719" for a period of 190 seconds and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C., and the panel remained in the oven for a period of 24 hours. The panel was then removed from the oven and placed into a conditioning chamber which was maintained at a relative humidity of 50% and a temperature of 20° C., and the panel remained in the chamber for a period of at least one week.

Three replicate panels were made in this manner for each of the surface layer bonding resin types. Six test specimens (2"×2") were cut from each conditioned laboratory panel. Each test specimen was subjected to an 'as-is' internal bond strength test in accordance with ASTM D1037. Test results are shown in Table 8.

TABLE 8

Test values for OSB made with experimental and control phenolic resin in the surface layers

| Surface Layer Liquid PF Resin | Average Internal Bond Strength (psi) |
|---|---|
| 155C42 produced by Georgia-Pacific Chemicals LLC | 87.1 |
| Experimental (5.0% degraded lignin & 18.0% urea) | 84.1 |
| Experimental (11.5% degraded lignin & 11.5% urea) | 97.4 |
| Experimental (19.7% degraded lignin & 5.0% urea) | 90.6 |

Note:
the failure mode (break location) of the test specimens was almost exclusively in the surface layer and interface between the surface and core layers of the OSB for each of the four different resins.

The test results shown in Table 8 help to demonstrate the range of degraded lignin levels suitable for the invented resin in an OSB application.

The invention claimed is:

1. A method of manufacturing an aqueous bonding resin, the method comprising:
   in a first stage, reacting phenol with formaldehyde in the presence of a kraft liquor degraded lignin polymer that is substantially free of sulfonic acid groups, water, and a group 1 alkaline metal hydroxide;
   wherein the reaction product of the phenol and formaldehyde are 40 to 85% of the weight of the solids in the aqueous bonding resin and the mole ratio of formaldehyde to phenol is 1.5-3.5:1;
   the group 1 alkaline metal hydroxide is 5 to 20% of the weight of the solids in the aqueous bonding resin; and
   the kraft liquor degraded lignin polymer is 5 to 20% of the weight of the solids in the aqueous bonding resin;
   reacting the ingredients at a temperature of 60-100° C. until the viscosity of the mixture is 200-5000 cps;
   in a subsequent second stage, cooling the mixture to a temperature less than 60° C.; and thereafter
   adding urea to the first stage reaction product until the viscosity is 50-1000 cps while maintaining the reaction temperature at less than 60° C.

2. The method of claim 1 in which the degraded lignin polymer has a moisture content of 15% or more.

3. The method of claim 1 in which the degraded lignin polymer has been washed and dewatered.

4. The method of claim 1 in which the degraded lignin polymer is readily soluble in a mixture of phenol, formaldehyde and water at a pH greater than 7.5 and temperature greater than 60° C.

5. The method of claim 1 in which the final viscosity of the second stage reaction is 100-500 cps.

6. The method of claim 1 in which the final viscosity of the second stage reaction is 120-350 cps.

7. The method of claim 1 in which water, a group 1 alkaline metal hydroxide, or a combination thereof, is also added in the second stage.

* * * * *